United States Patent
Narita et al.

(10) Patent No.: US 10,397,442 B2
(45) Date of Patent: Aug. 27, 2019

(54) IMAGE PROCESSING APPARATUS PERFORMING EDGE CORRECTION PROCESS ON SCAN DATA AND ACQUIRING CHARACTERISTIC INFORMATION

(71) Applicant: Brother Kogyo Kabushiki Kaisha, Nagoya-shi, Aichi-ken (JP)

(72) Inventors: Kenju Narita, Nagoya (JP); Hiroya Nojiri, Nagoya (JP); Kenji Tamaki, Ichinomiya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 16/115,655

(22) Filed: Aug. 29, 2018

(65) Prior Publication Data
US 2019/0068839 A1    Feb. 28, 2019

(30) Foreign Application Priority Data

Aug. 31, 2017 (JP) .................................. 2017-166933

(51) Int. Cl.
| | |
|---|---|
| *H04N 1/60* | (2006.01) |
| *H04N 1/58* | (2006.01) |
| *G06T 3/40* | (2006.01) |
| *G06T 7/90* | (2017.01) |

(Continued)

(52) U.S. Cl.
CPC .............. *H04N 1/58* (2013.01); *G06T 3/403* (2013.01); *G06T 7/13* (2017.01); *G06T 7/90* (2017.01); *H04N 1/00724* (2013.01); *H04N 1/00758* (2013.01); *H04N 1/00779* (2013.01);

(Continued)

(58) Field of Classification Search
None
See application file for complete search history.

(56) References Cited

U.S. PATENT DOCUMENTS

| | | | |
|---|---|---|---|
| 2008/0117442 A1* | 5/2008 | Kosaka | ............... H04N 1/00127 358/1.6 |
| 2013/0265606 A1* | 10/2013 | Tsuya | ................... H04N 1/0035 358/1.15 |

(Continued)

FOREIGN PATENT DOCUMENTS

JP    2015-226179 A    12/2015

*Primary Examiner* — Dung D Tran
(74) *Attorney, Agent, or Firm* — Banner & Witcoff, Ltd.

(57) ABSTRACT

In an information processing apparatus, a processor determines, on the basis of a setting value, at least one image process to be performed on the first scan data. The processor performs a clipping process on first scan data to generate second scan data including original scan data and not including outer scan data. The processor performs an edge correction process on the second scan data to generate third scan data by correcting edge data of the original scan data. The processor performs a characteristic acquisition process on the third scan data to acquire characteristic information indicating a characteristic of the third scan data. The processor performs a specific process on the second scan data by using the characteristic information in a case where both the clipping process and the characteristic acquisition process are determined to be performed and the edge correction process is determined not to be performed.

11 Claims, 9 Drawing Sheets

(51) Int. Cl.
*G06T 7/13* (2017.01)
*H04N 1/00* (2006.01)
(52) U.S. Cl.
CPC .............. *G06T 2207/10008* (2013.01); *G06T 2207/20192* (2013.01)

(56) References Cited

U.S. PATENT DOCUMENTS

2014/0320934 A1* 10/2014 Muraishi .............. H04N 1/4074
                                                        358/453
2015/0092210 A1*  4/2015 Tsugimura ............... H04N 1/41
                                                        358/1.13
2016/0261758 A1*  9/2016 Kimura ................ H04N 1/0032
2017/0126915 A1*  5/2017 Ishido .................. H04N 1/0057

* cited by examiner

IMAGE PROCESSING APPARATUS PERFORMING EDGE CORRECTION PROCESS ON SCAN DATA AND ACQUIRING CHARACTERISTIC INFORMATION

CROSS REFERENCE TO RELATED APPLICATION

This application claims priority from Japanese Patent Application No. 2017-166933 filed Aug. 31, 2017. The entire content of the priority application is incorporated herein by reference.

TECHNICAL FIELD

The present disclosure relates to a control program and an image processing apparatus for processing scan data read from an original.

BACKGROUND

There is known a scanner capable of automatically detecting the size of an original to be read.

SUMMARY

However, when the scanner processes the scan data to automatically extract an image of the original, there is a possibility that the peripheral parts of the extracted image will include unnecessary data. For example, an image of the inside of the scanner cover may appear in the peripheral parts of the extracted image. As a consequence, the scanner cannot perform an image process on the extracted image with high precision. Therefore, the conventional technology cannot accurately process an extracted image when the target image is extracted automatically.

In view of the foregoing, it is an object of the disclosure to provide a technique for processing an extracted image with high accuracy in a case the image is extracted automatically.

In order to attain the above and other objects, the disclosure provides a non-transitory computer readable storage medium storing a set of program instructions for an information processing apparatus including an interface and a processor. The set of program instructions, when executed by the processor, cause the information processing apparatus to: receive a setting value via the interface; acquire first scan data; determine, on the basis of the setting value, at least one image process to be performed on the first scan data from among a plurality of image processes, data obtained after all of the at least one image process is performed on the first scan data being to be outputted, the plurality of image processes including a clipping process, an edge correction process, and a characteristic acquisition process; perform the clipping process on the first scan data to generate second scan data including original scan data and not including outer scan data, the original scan data being determined as a part of the first scan data representing an original image, the outer scan data being determined as another part of the first scan data representing an outer image around the original image, the original scan data including an edge data representing an edge of the original image; perform the edge correction process on the second scan data to generate third scan data by correcting the edge data; perform the characteristic acquisition process on the third scan data to acquire characteristic information indicating a characteristic of the third scan data; and perform a specific process on the second scan data by using the characteristic information which is acquired by using the third scan data in a case where the determining determines both the clipping process and the characteristic acquisition process are to be performed and the edge correction process is not to be performed.

According to another aspect, the disclosure provides an information processing apparatus. The information processing apparatus includes an interface and a processor configured to: receive a setting value via the interface; acquire first scan data; determine, on the basis of the setting value, at least one image process to be performed on the first scan data from among a plurality of image processes, data obtained after all of the at least one image process is performed on the first scan data being to be outputted, the plurality of image processes including a clipping process, an edge correction process, and a characteristic acquisition process; perform the clipping process on the first scan data to generate second scan data including original scan data and not including outer scan data, the original scan data being determined as a part of the first scan data representing an original image, the outer scan data being determined as another part of the first scan data representing an outer image around the original image, the original scan data including an edge data representing an edge of the original image; perform the edge correction process on the second scan data to generate third scan data by correcting the edge data; perform the characteristic acquisition process on the third scan data to acquire characteristic information indicating a characteristic of the third scan data; and perform a specific process on the second scan data by using the characteristic information which is acquired by using the third scan data in a case where the determining determines both the clipping process and the characteristic acquisition process are to be performed and the edge correction process is not to be performed.

BRIEF DESCRIPTION OF THE DRAWINGS

The particular features and advantages of the disclosure as well as other objects will become apparent from the following description taken in connection with the accompanying drawings, in which.

DETAILED DESCRIPTION

Structure of a Scanning System

Figure 1:
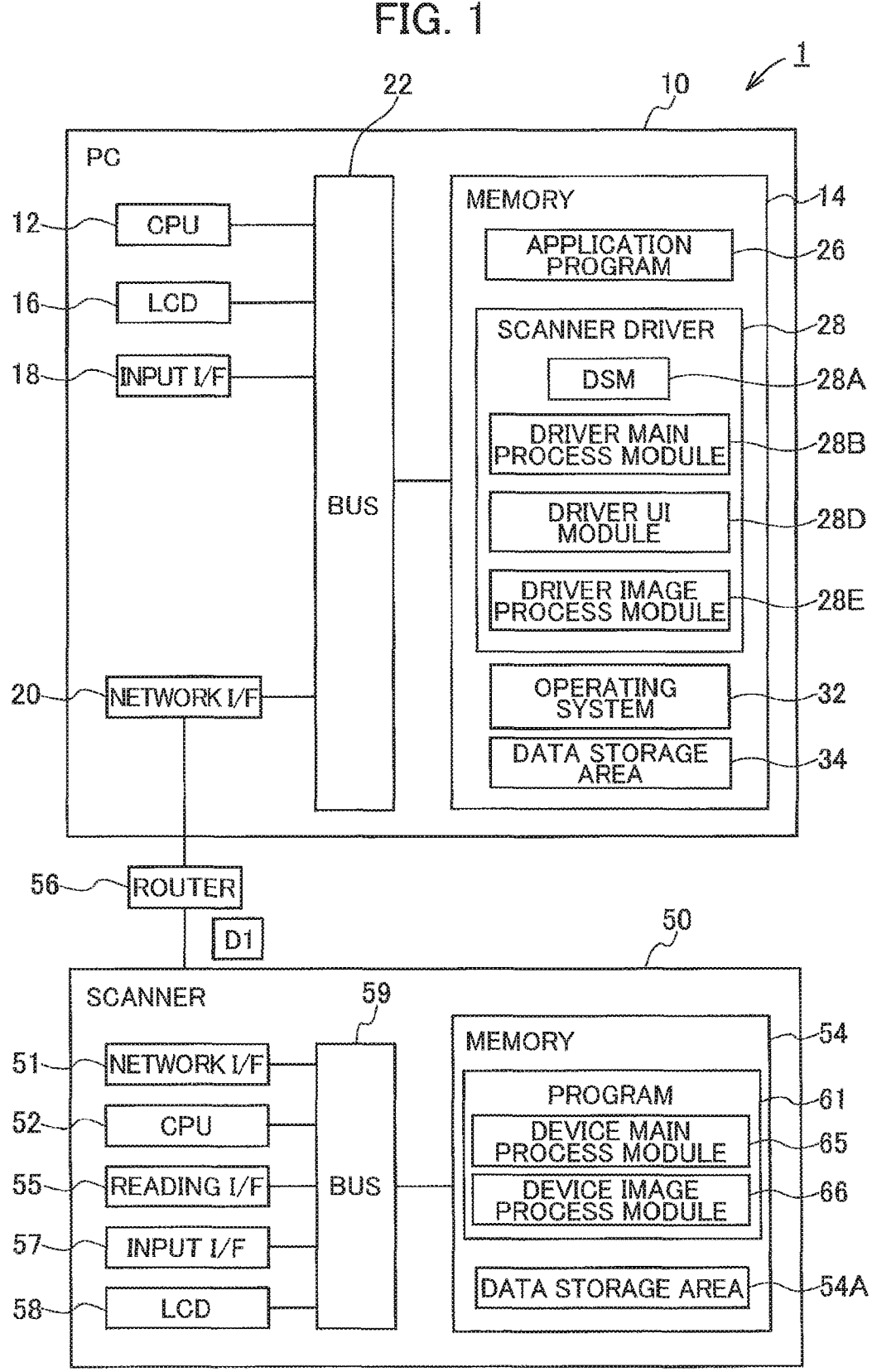
FIG. 1 is a block diagram of a scanning system according to an embodiment.

FIG. 1 is a block diagram of a scanning system 1 according to an embodiment of the present disclosure. The scanning system 1 includes a personal computer (PC) 10 (an example of the image processing apparatus), a scanner 50 (an example of the image processing apparatus), and a router 56.

The PC 10 primarily includes a CPU 12 (an example of the computer and the controller), a memory 14, a liquid crystal display (LCD) 16 (an example of the user interface), an input interface 18 (an example of the user interface), and a network interface 20. All components in the PC 10 are interconnected and capable of communicating with each other via a bus 22. Note that "interface" is also abbreviated as "I/F" in the drawings.

The CPU 12 executes processes according to an application program 26, a scanner driver 28 (an example of the control program), and an operating system (hereinafter abbreviated as "OS") 32 stored in the memory 14. The application program 26 is capable of executing a character recognition process implemented with a well-known optical character recognition technology on scan data D1 for an image scanned by the scanner 50, for example. More specifically, the application program 26 is image-editing software such as Adobe Photoshop (registered trademark).

The scanner driver 28 is the device driver for the scanner 50 that controls operations of the same. The scanner driver 28 has a data source manager (DSM) 28A, a driver main process module 28B, a driver user interface module 28D, and a driver image process module 28E. The DSM 28A is a program in the scanner driver 28 that functions as an interface for inputting data from the application program 26 and outputting data to the application program 26. The scanner driver 28 performs communications in conformance with the TWAIN communications protocol. Note that the above configuration of the scanner driver 28 is merely an example and may be modified to suit the type of scanner driver 28 and the like. For example, when the scanner driver 28 performs communications based on a protocol other than TWAIN, such as Windows image acquisition protocol, the scanner driver 28 need not be provided with the DSM 28A. In this case, the OS 32 may implement the processes that will be performed by the DSM 28A in the following description.

The driver main process module 28B, the driver user interface module 28D, and the driver image process module 28E execute various processes as modules included in the scanner driver 28. The driver main process module 28B exchanges data with the scanner 50 and issues commands to the scanner 50. The driver user interface module 28D displays configuration screens and the like. The driver image process module 28E executes image processes on the scan data D1.

The OS 32 is a program that provides basic functions used by the application program 26 and the scanner driver 28. In the following description, the action of the CPU 12 executing the application program 26 and the like may be simply referred to by the program name. For example, the phrase "the application program 26" may be used to signify "the CPU 12 executing the application program 26."

The memory 14 is also provided with a data storage area 34. The data storage area 34 serves to store data and the like required when executing the application program 26 and the like. Note that the memory 14 is configured of a combination of storage memory that includes a random access memory (RAM), a read-only memory (ROM), a flash memory, a hard disk drive (HDD), and a buffer provided in the CPU 12.

The memory 14 may be any computer-readable storage medium. A computer-readable storage medium is a non-transitory medium. In addition to the above examples, non-transitory media include CD-ROM and DVD-ROM. A non-transitory medium is also a tangible medium. On the other hand, electric signals that convey programs downloaded from a server or the like on the Internet are a computer-readable signal medium, which is one type of computer-readable medium but is not considered a non-transitory computer-readable storage medium. This description also applies to a memory 54 provided in the scanner 50 described later.

The LCD 16 displays various functions of the PC 10. The input interface 18 is an interface that enables the user to input operations and includes a keyboard, a mouse, and the like. The network interface 20 is connected to a network interface 51 of the scanner 50 via the router 56. This connection enables the PC 10 and the scanner 50 to exchange information.

The scanner 50 is a device that reads an image printed on an original and generates scan data D1 representing this image. In addition to the network interface 51 mentioned above, the scanner 50 is provided with a CPU 52, a memory 54, a reading interface 55, an input interface 57, and an LCD 58. All of the components in the scanner 50 are interconnected and capable of communicating with each other via a bus 59.

The CPU 52 executes processes according to a program 61 stored in the memory 54. The memory 54 is configured of a combination of RAM, ROM, and the like. The memory 54 is also provided with a data storage area 54A. The data storage area 54A serves to store data and the like required when executing the program 61.

The program 61 performs overall control of the scanner 50. The program 61 has a device main process module 65, and a device image process module 66. The scanner 50 is controlled by the PC 10 to transmit scan data D1 to the PC 10. The CPU 52 executes a generation process for generating the scan data D1 and image processes for processing the scan data D1 according to the device main process module 65 and the device image process module 66. The device main process module 65 and the device image process module 66 will be described later in greater detail. The reading interface 55 is a charge-coupled device, a contact image sensor, or another device for reading images. The input interface 57 allows the user to perform input operations and includes a liquid crystal display and various switches and the like. The LCD 58 displays various functions of the scanner 50.

Operational Sequence for Reading an Image

Figure 2:
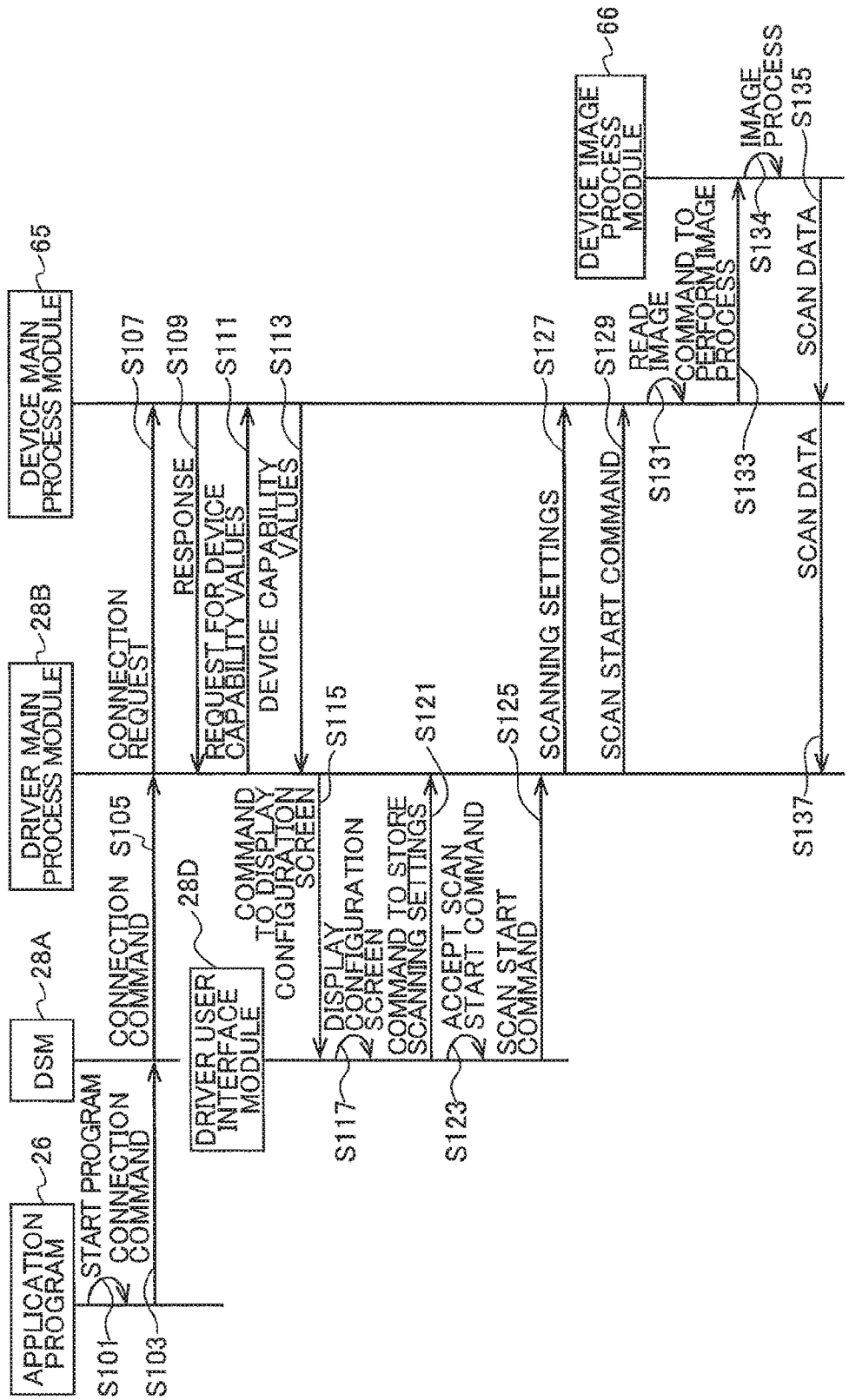
FIG. 2 is a sequence diagram illustrating operations for reading an image.
Figure 3:
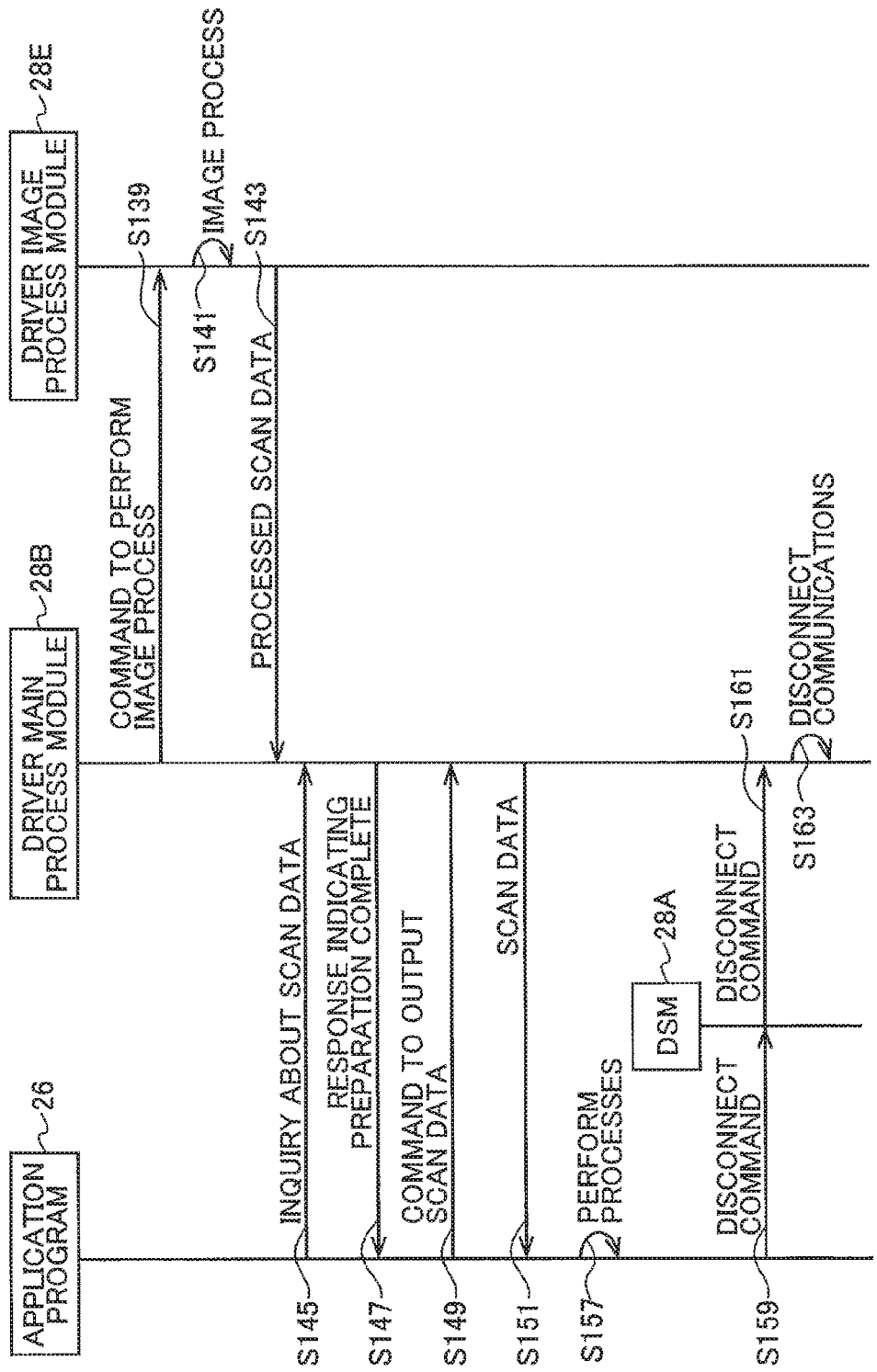
FIG. 3 is a sequence diagram illustrating operations for reading an image performed subsequent to operations shown in FIG. 2.

Next, the sequence of operations performed on the scanning system 1 when the user operates the PC 10 and the scanner 50 reads an image will be described. FIGS. 2 and 3 show an example of the operational sequence for reading an image.

In general, the sequence charts in this specification depict steps performed by the CPUs 12 and 52 according to instructions described in programs. In other words, actions such as "determine," "extract," "select," "calculate," "set," "identify," "acquire," "receive," "control," and "configure" in the following description represent steps performed by the CPU 12 or the CPU 52. Steps performed by the CPU 12 include processes that control hardware through the OS 32. Note that the concept of "acquire" in this specification does not necessarily require a request. In other words, a process in which the CPU 12 receives data without requesting such data includes the concept of the CPU 12 acquiring data.

Further, "data" in this specification represents bit strings that a computer can read. Data of different formats are treated as the same data when the content of the data is essentially the same. The same holds true for "information" in the specification. Further, processes such as "command," "response" and "request" are performed by communicating information specifying the "command," "response," and "request". Further, the terminology "command," "response," and "request" may signify the information specifying the command, the response, and the request, respectively.

In S101 of FIG. 2, the application program 26 is started in response to an operation inputted through the input interface 18 of the PC 10. In S103 and S105 the application program 26 issues a command via the DSM 28A of the scanner driver 28 to the driver main process module 28B to establish a connection with the scanner 50. In S107 the driver main process module 28B transmits a connection request to the scanner 50 via the router 56.

In response to receiving the connection request from the driver main process module 28B of the PC 10, in S109 the device main process module 65 of the scanner 50 transmits a response for establishing a connection. Through this process, communication is established between the PC 10 and the scanner 50. After establishing communication with the device main process module 65, in S111 the driver main process module 28B transmits a request for device capability values to the device main process module 65.

In this example, the device capability values denotes values specifying each of the plurality of processes that can be executed on the scanner 50, the scanner driver 28, such as capability values related to the size of an original. Information on the original size includes information on the maximum size of an original that the scanner 50 can read, and information indicating whether the scanner 50 or the scanner driver 28 can execute an original detection process. The original detection process is for automatically detecting the size of the original without user input specifying the size of the original to be read and is an example of the clipping process in the present disclosure.

The device capability values may include values related to the color scales of scan data that the scanner 50 can generate. A color scale is a value specifying the number of colors that can be set for one pixel in bitmap image data and may include the 24-bit (166,777,216 colors) color scale, the 8-bit (256 colors) grayscale, and the 1-bit (two colors: white and black) monochrome scale. Color scale is also referred to as color depth. In other words, the color scale indicates the color space of the scan data and total gradation levels of the color space. Capability values for color scale may include information specifying what values can be set for a parameter indicating the color scale of scan data to be generated by the scanner 59, information specifying whether the scanner 50 can execute a scale detection process, and information specifying whether the scanner 50 can execute a process for automatically determining a suitable color scale for the detected number of colors and converting the scan data to data represented by the suitable color scale. Here, the scale detection process is for automatically detecting the number of colors included in a scanned original and is an example of the characteristic information acquisition process.

The device capability values may also include a capability value related to a process for detecting a blank original. In some cases, the original being read is a blank sheet, i.e., a blank original. The capability value for a process related to detect blank originals may include information specifying that the scanner 50 can execute a blank sheet detection process. The blank sheet detection process is for detecting whether the scan data generated by reading an original includes scan data of a blank original, and is an example of the characteristic information acquisition process. The scanner 50 of the embodiment can execute each of the original detection process, the scale detection process, the scale conversion process, and the blank sheet detection process. Further, in the embodiment, the PC 10 (the scanner driver 28) can also execute each of the original detection process, the scale detection process, and the blank sheet detection process. In the embodiment, though the scanner 50 can perform each of the original detection process, the scale detection process, the scale conversion process, and the blank sheet detection process, the scanner 50 does not perform these process, instead the scanner driver 28 performs the original detection process, the scale detection process, the scale conversion process, and the blank sheet detection process in a case where executions of these processes are specified through the configuration screens by the user as described below. This is because when the PC 10 performs the original detection process, the original detection process can be made with higher accuracy than when the scanner 50 performs the original detection process as described later. Further, the scale detection, the scale conversion process, and the blank sheet detection can be made with high accuracy after the original detection process is performed as described later.

In response to receiving the request for device capability values from the scanner driver 28, in S113 the device main process module 65 transmits values specifying its own device capability values. In response to receiving the device capability values from the device main process module 65, in S115 the driver main process module 28B issues a command to the driver user interface module 28D of the scanner driver 28 to display a configuration screen. The configuration screen is displayed on the basis of the device capability values transmitted from the device main process module 65 and can be used for accepting settings for processes related to image reading that are available on the scanner 50 or the scanner driver 28.

Specifically, the driver user interface module 28D displays the configuration screen based on the capability values for the original size in order to accept from the operation by the user to set a parameter to a setting value indicating whether to execute the original detection process and a parameter to a setting value specifying the original size. The driver user interface module 28D also displays a configuration screen on the basis of the capability values for color scale in order to accept operation by the user to set a parameter to a setting value indicating whether to execute the scale detection process and a parameter to a setting value specifying the color scale. The driver user interface module 28D also displays a configuration screen based on the capability values for a process to detect a blank original in order to accept operation by the user to set a parameter to a setting value indicating whether to execute a blank sheet detection process. All of the settings may be made via one configuration screen.

In S117 the driver user interface module 28D displays each configuration screen on the LCD 16 of the PC 10 according to the commands received from the driver main process module 28B. When an OK button in the configuration screen is operated, the driver user interface module 28D stores in the memory 14 all values set for scanning parameters used in image reading (an example of the accepting). Specifically, the stored values are set through operations by the user on the input interface 18 up until the OK button is operated. Hereinafter, these values may be called "scanning settings" or "scanning setting values" for the scanning parameters and an example of the setting values. Here, the action of the CPU 12 storing settings in the memory 14 based on user operations may also be called "accepting settings" or "configuring settings." The operation of pressing a button in the configuration screen displayed on the LCD 16 is an example of a setting operation. The scanning settings may be setting values that are directly specified through user operations. For example, a setting specifying the resolution "600 dpi" may be stored in the memory 14 in response to a setting operation specifying "600 dpi." The scanning settings may also be settings specified indirectly through setting operations. For example, a setting value for the resolution "600 dpi" may be stored in the memory 14 in response to a setting operation specifying "high quality." The method of accepting scanning settings is not limited to a method using a configuration screen displayed on the LCD 16, but may be a method of reading a configuration file storing a description of scanning settings, for example.

The scanning settings include setting values related to the original size, such as a setting value indicating whether to execute the original detection process and a setting value specifying the size of the original set through a user operation. The scanning settings further include setting values related to color scale, such as a setting value indicating whether to execute the scale detection process and a setting value indicating the color scale set through a user operation. The scanning settings also include setting values related to the process for detecting a blank original such as a setting value indicating whether to execute the blank sheet detection process.

After the settings have been received, in S121 the driver user interface module 28D outputs the scanning settings to the driver main process module 28B and issues a command to the driver main process module 28B to store the scanning settings. The driver main process module 28B stores the scanning settings received from the driver user interface module 28D in the data storage area 34 of the memory 14, for example.

In S123 the driver user interface module 28D accepts a scan start command from the user. For example, if the user performs an operation in the configuration screen displayed in S117 described above to initiate a scan, in S123 the driver user interface module 28D receives this operation, and in S125 outputs a scan start command to the driver main process module 28B.

In response to receiving the scan start command from the driver user interface module 28D, in S127 the driver main process module 28B first transmits to the device main process module 65 the scanning settings that were stored in S121 described above, i.e., the scanning settings received through the configuration screen. Here, settings related to the process(es) to be executed on the scanner 50 are transmitted to the device main process module 65 among the scanning settings received from the user.

In S129 the driver main process module 28B transmits the scan start command to the device main process module 65. In response to receiving the scan start command from the driver main process module 28B, in S131 the device main process module 65 executes a process for driving the reading interface 55 to read an image from an original.

The device main process module 65 generates scan data D1 based on data outputted from the reading interface 55. In S133 the device main process module 65 issues a command to the device image process module 66 to perform the image process(es) on the scan data D1. In S133 the device main process module 65 also outputs the scan data D1 and the scanning settings received in S127 to the device image process module 66. In S134 the device image process module 66 executes the image process(es) on the scan data D1 based on the scanning settings received from the device main process module 65. In S135 the device image process module 66 outputs the scan data D1 processed in S134 to the device main process module 65.

In S137 the device main process module 65 transmits to the driver main process module 28B the scan data D1 that has undergone the image process(es) by the device image process module 66 in S134. In this process, the device main process module 65 may receive one line worth of the scan data D1 from the device image process module 66 at a time and may transmit the received line worth of scan data D1 to the driver main process module 28B, for example. In other words, the device main process module 65 transmits the scan data D1 each time the device image process module 66 has completed the image process(es) for one line. However, the device main process module 65 is not limited to a configuration for transmitting the scan data D1 line-by-line. For example, the device main process module 65 may transmit the scan data D1 after the image process(es) has (have) been completed for one page of the original. Alternatively, the device main process module 65 may transmit the scan data D1 altogether after images for all the sheets in the original has been read and processed.

The device main process module 65 may also perform a process to compress the scan data D1 before transmitting the scan data D1 to the driver main process module 28B in order to reduce the data volume. In this case, the driver main process module 28B decompresses the compressed scan data D1 received from the device main process module 65 and uses the decompressed scan data D1 in subsequent processes.

In S137, the driver main process module 28B stores the received scan data D1 in the memory 14. In S139 of FIG. 3, the driver main process module 28B issues a command to the driver image process module 28E, which is a module belonging to the scanner driver 28, to perform one or more image process on the scan data D1. Further, in S139 the driver main process module 28B also outputs the scan data D1 received from the device main process module 65 in S137 of FIG. 2 to the driver image process module 28E. In S139 the driver main process module 28B also outputs the scanning settings stored in S121 of FIG. 2 to the driver image process module 28E. Here, settings related to the image process(es) to be performed on the PC 10 are outputted to the driver image process module 28E among the scanning settings received via the setting screen from the user through S121 and S127.

In S141 the driver image process module 28E performs the image process(es) on the scan data D1 based on the scanning settings received from the driver main process module 28B. In S143 the driver image process module 28E outputs the scan data D1 on which the image process(es) is (are) performed in S141 (hereinafter referred to as the processed scan data D1) to the driver main process module 28B.

In the meantime, in S145 the application program 26 issues periodic inquiries regarding whether the processed scan data D1 exists to the driver main process module 28B. For example, after the driver user interface module 28D outputs the scan start command to the driver main process module 28B in S125 of FIG. 2, in S145 the application program 26 begins issuing periodic queries about the processed scan data D1 to the driver main process module 28B.

Specifically, in S145 the application program 26 periodically queries the driver main process module 28B regarding whether the processed scan data D1 received from the scanner 50 is ready to transfer. The application program 26 may also be configured to wait until the processed scan data D1 is outputted from the driver main process module 28B without issuing periodic inquiries to the driver main process module 28B.

In S147 the application program 26 receives a response from the driver main process module 28B to the query issued in S145. In response to receiving this response, in S149 the application program 26 issues a command to the driver main process module 28B to output the processed scan data D1. In response to receiving the command from the application program 26 to output the processed scan data D1, in S151 the driver main process module 28B outputs the processed scan data D1 to the application program 26.

In S157 the application program 26 executes a prescribed process on the processed scan data D1 received from the driver main process module 28B. Here, the prescribed process is a process requested by the user, such as a process to print the processed scan data D1. As alternatives, the application program 26 may execute a process to store the processed scan data D1 on the PC 10 (in the memory 14), a process to display the processed scan data D1 on the LCD 16, one or more image processes for the processed scan data D1, a process to transfer the processed scan data D1 to another application program, and/or a process to transfer the processed scan data D1 to a server.

After completing the process in S157, in S159 the application program 26 outputs a disconnect command to the DSM 28A, and in S161 the DSM 28A relays the disconnect command to the driver main process module 28B. Here, the application program 26 issues the disconnect command to the driver main process module 28B via the DSM 28A to disconnect communications with the device main process module 65 (scanner 50). In S163 the driver main process module 28B disconnects communications with the device main process module 65 in response to the disconnect command received from the application program 26. This completes the process of reading an image with the scanner 50 under the control of the application program 26 on the PC 10.

Image Reading Process

Next, an example of an image reading process according to the above operational sequence will be described. The scanning system 1 according to the embodiment can read images from originals of various sizes. When the scanning setting specifying the option to execute automatic detection of the original size is set for the above scanning parameter, the scanning system 1 executes an original size detection process on the PC 10. Specifically, the scanning system 1 uses the scanner 50 to generate, as the scan data D1, an image larger than the size of the original for each of originals of varying sizes, and performs a process to crop (clip) the original image from the scan data D1 on the PC 10.

Figure 4:
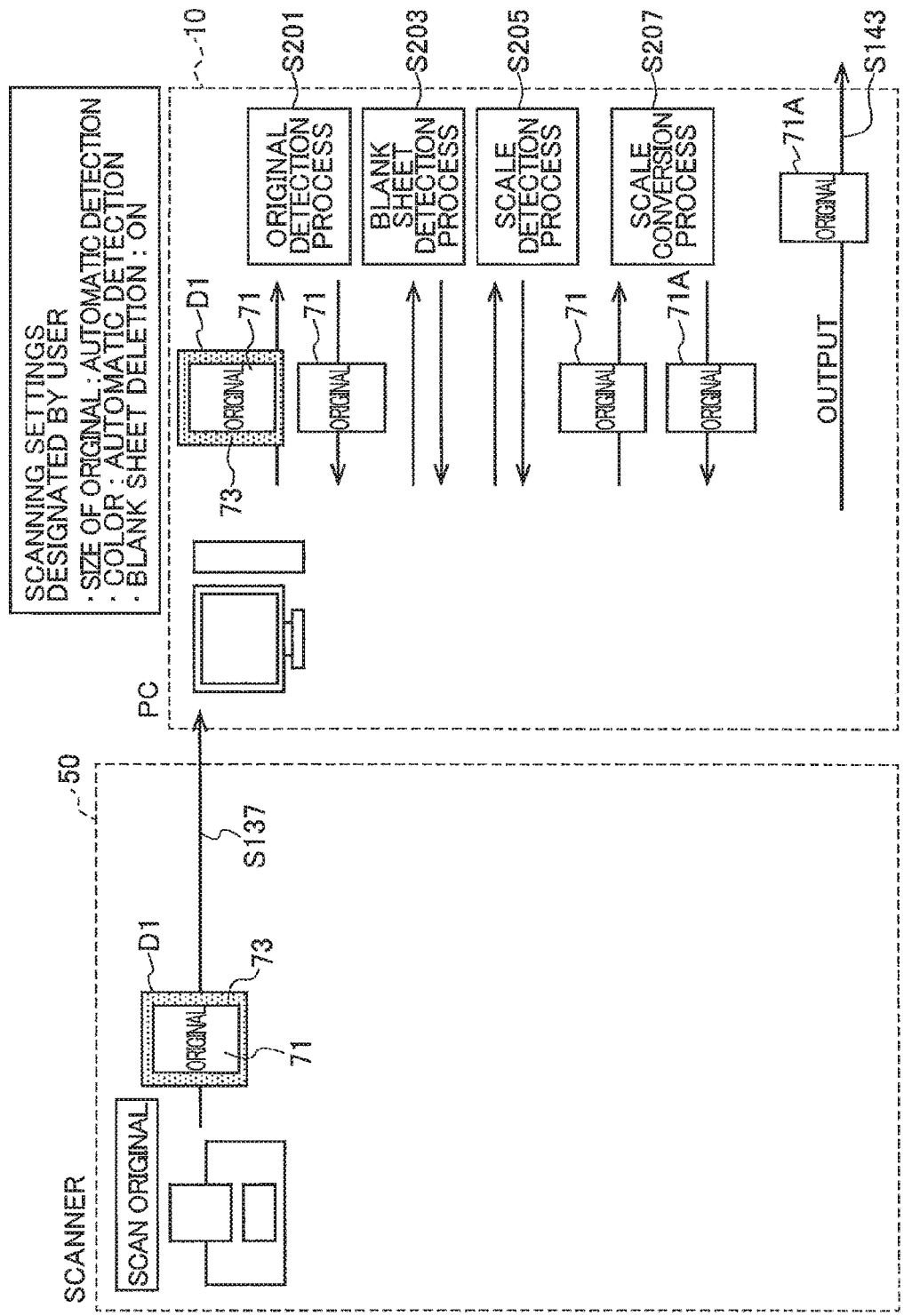
FIG. 4 is an explanation diagram illustrating processes performed when reading image.

FIG. 4 shows a detailed example of an image reading process. In the example of FIG. 4, one scanning parameter has been set to the setting value indicating that for the original size is to be automatically detected and the original image is to be automatically extracted, a scanning parameter has been set to the setting value indicating that the colors of the scanned original are to be detected, and a scanning parameter has been set to the setting value indicating that blank sheet detection is to be performed. In the following description, it will be assumed that the largest original that the scanner 50 can read is an A4-sized original, while the size of the actual original being read in this example will be the postcard size. In this case, the scanner 50 reads the original of postcard size, which is smaller than the A4 size, as an A4-size original, i.e., the maximum size that the scanner 50 can read.

First, the scanner 50 reads the original having the postcard-size, and generates A4-size scan data D1 including original scan data 71 for the postcard-size original, as shown in FIG. 4. Specifically, the generated scan data D1 includes original scan data 71 and outer scan data 73 around the outer edges of the original scan data 71. The scan data 71 corresponds to the postcard-size original. The outer scan data 73 corresponds to the area in A4 size image data that does not fit inside the postcard size. For example, the outer scan data 73 is an image of the scanner's cover that presses the back surface of the original against the original platen at which the scanner 50 reads the original. If the inside (side facing the original) of the scanner's cover has a gray tone, the scanner 50 reads a gray colored background as the outer scan data 73 that surrounds the original scan data 71 and adds the outer scan data 73 to the periphery of the original scan data 71.

The scanner 50 transmits the scan data D1 with the outer scan data 73 added to the original scan data 71 to the PC 10. This transmission process corresponds to S137 of FIG. 2. On the PC 10, the driver image process module 28E performs the image process(es) on the scan data D1, as described above (S141 of FIG. 3). When the scanner 50 transmits the scan data D1 having the outer scan data 73 added to the original scan data 71 to the PC 10, i.e., when the original size is to be detected by the PC 10, the scanner 50 generates and transmits the scan data D1 at the maximum color scale, which is 24-bit color (3 color components and 8 bit gradation levels for each color component) in this example. Thus, when detecting the original in the original detection process in S201, the PC 10 can easily detect the outer scan data 73 through color differentiation. Subsequently, the PC 10 can suitably reduce the number of colors to an optimal number in a scale conversion process in S207 described later. Thus, setting indicating that the original size is to be automatically detected in the scanning system 1 of the embodiment leads to the PC 10 requesting the scanner 50 to transmit the scan data D1 in 24-bit color, even when the color scale in the scanning settings is set to monochrome. Note that the color scale of the scan data D1 transmitted from the scanner 50 to the PC 10 is not limited to 24-bit color. If the PC 10 can detect the outer scan data 73 based on scan data D1 at 8-bit gray scale, the scanner 50 may transmit scan data D1 in gray scale to the PC 10.

In S201 of FIG. 4, the driver image process module 28E executes the original detection process to detect the original scan data 71 in the scan data D1 as the image process of S141 in FIG. 3. The driver image process module 28E processes the image of the scan data D1 based on the color of the outer scan data 73 (gray, for example) to detect the outer scan data 73 included in the scan data D1. The device main process module 65 may transmit the color of the outer scan data 73 to the driver main process module 28B in the process for acquiring device capability values for the scanner 50 (S111 and S113 of FIG. 2), and the driver main process module 28B may transmit the color of the outer scan data 73 to the driver image process module 28E in S139, for example. The driver image process module 28E detects image areas in the peripheral portion of the scan data D1 corresponding to the color of the outer scan data 73 acquired through the above acquisition process (S111, S113) and the transmission process (S139) as an image of the outer scan data 73, for example. The driver image process module 28E then performs an image process to extract the portion of the scan data D1 other than the detected outer scan data 73 as the original scan data 71. Here, the image process for extracting image data may also be called an image process for cropping (clipping) image data.

In S203 the driver image process module 28E executes a blank sheet detection process on the original scan data 71 extracted in S201, i.e., the scanned image of the original, to determine whether the scan data is based on a blank sheet. For example, the driver image process module 28E detects that extracted the original scan data 71 is a blank sheet when the original scan data 71 is entirely white. When the driver image process module 28E detects a blank sheet in S203, the scanner driver 28 may notify the user through the driver main process module 28B and the application program 26 that a blank sheet was detected (an example of the specific process). Alternatively, when the scan data D1 represents images of a plurality of sheets and one or more blank sheet is detected in S203, the driver image process module 28E may eliminate only the sheet(s) worth of the original scan data 71 corresponding to the blank sheet(s) from the scan data D1 and may output the remainder of the original scan data 71 other than the blank sheet to the driver main process module 28B as the processed scan data D1 (an example of the specific process).

In S205 the driver image process module 28E performs the scale detection process to detect the number of colors used in the original scan data 71 extracted in S201 and to determine a color scale, that is, color components (or color space) and color depths (total gradation levels) suitable for the scan data 71. Any well-known image processing method may be used to detect the color scale. For example, the driver image process module 28E determines that the suitable color scale of the original scan data 71 is a 24-bit color image, an 8-bit gray scale image, or a monochrome image based on the number of colors included in the original scan data 71. The suitable color scale is an optimized color scale suitable for the original image data 71. In other words, the suitable color scale is a minimal color scale that can represents an image of the original image data 71.

In S207 the driver image process module 28E executes a scale conversion process to convert the color scale of the original scan data 71 to the suitable color scale determined in S205. For example, when the driver image process module 28E determines in S205 that the suitable color scale of the original scan data 71 is monochrome, i.e., that the original scan data 71 includes only white and black colors, in S207 the driver image process module 28E converts the color original scan data 71 to monochrome original scan data 71A. Converting the color original scan data 71 received from the scanner 50 to an optimum color scale reduces the number of color components and total gradation levels and, hence, reduces the volume of data constituting the original scan data 71. The driver image process module 28E outputs the original scan data 71A after converting the color scale. This output process corresponds to the process in S143 of FIG. 3 described above. Accordingly, in S143 the driver image process module 28E outputs the converted original scan data 71A to the driver main process module 28B as the processed scan data D1.

Next, a case in which the original size is detected on the scanner 50 will be described. The scanner 50 detects the length of the original in the main scanning direction on the basis of image data generated by the reading interface 55, for example. The scanner 50 also detects the length of the original in the subscanning direction based on a physical paper sensor. The length of the original in the main scanning direction corresponds to the width of the original, and the length of the original in the subscanning direction corresponds to the height of the original. Here, the physical paper sensor may be a roller-type sensor, for example, that rotates while moving over the original in the subscanning direction during image reading and detects the height dimension of the original on the basis of level differences at the edges of the original. However, when detecting the original size with this type of paper sensor, error of a few millimeters may be introduced depending on the detection precision of the sensor. The scanning system 1 according to the embodiment can extract the original scan data 71 with great precision by detecting the original size through the image process on the PC 10.

Further, the precision for detecting a blank sheet and the like may be poor when executing the blank sheet detection process (S203) and the scale detection process (S205) on the scan data D1 having the outer scan data 73 as well as the original scan data 71. For example, if the original scan data 71 is a blank sheet and gray color is included in the scan data D1 as the outer scan data 73, the scan data D1 will include two colors, i.e., the white color of the original scan data 71 and the gray color of the outer scan data 73. Since the scan data D1 includes gray color, there is a possibility that the original scan data 71 cannot be accurately determined to be a blank sheet in the blank sheet detection process. Further, if the scan data D1 is determined to include data specifying a gray color, the suitable color scale of the original may not be accurately determined in the scale detection process. However, the scanning system 1 according to the embodiment executes the blank sheet detection process (S203) and the scale detection process (S205) using the original scan data 71 after eliminating the outer scan data 73 from the scan data D1 in the original detection process (S201), thereby improving precision for blank sheet detection and color scale detection.

While detection of the original size and extraction of the original scan data 71 are performed on the PC 10 in the example of FIG. 4 described above, the original detection process need not be performed on the PC 10 when the original size has been set for the scanning parameter, for example. In this case, the blank sheet detection process (S203) and the scale detection process (S205) may be performed on the scanner 50. Executing the image process(es) based on the original size set by the user in the scanning settings and not executing an unnecessary original detection process on the PC 10 can improve the speed of the reading process.

Original Edge Correction Process and Blank Sheet Detection Process

Figure 5:
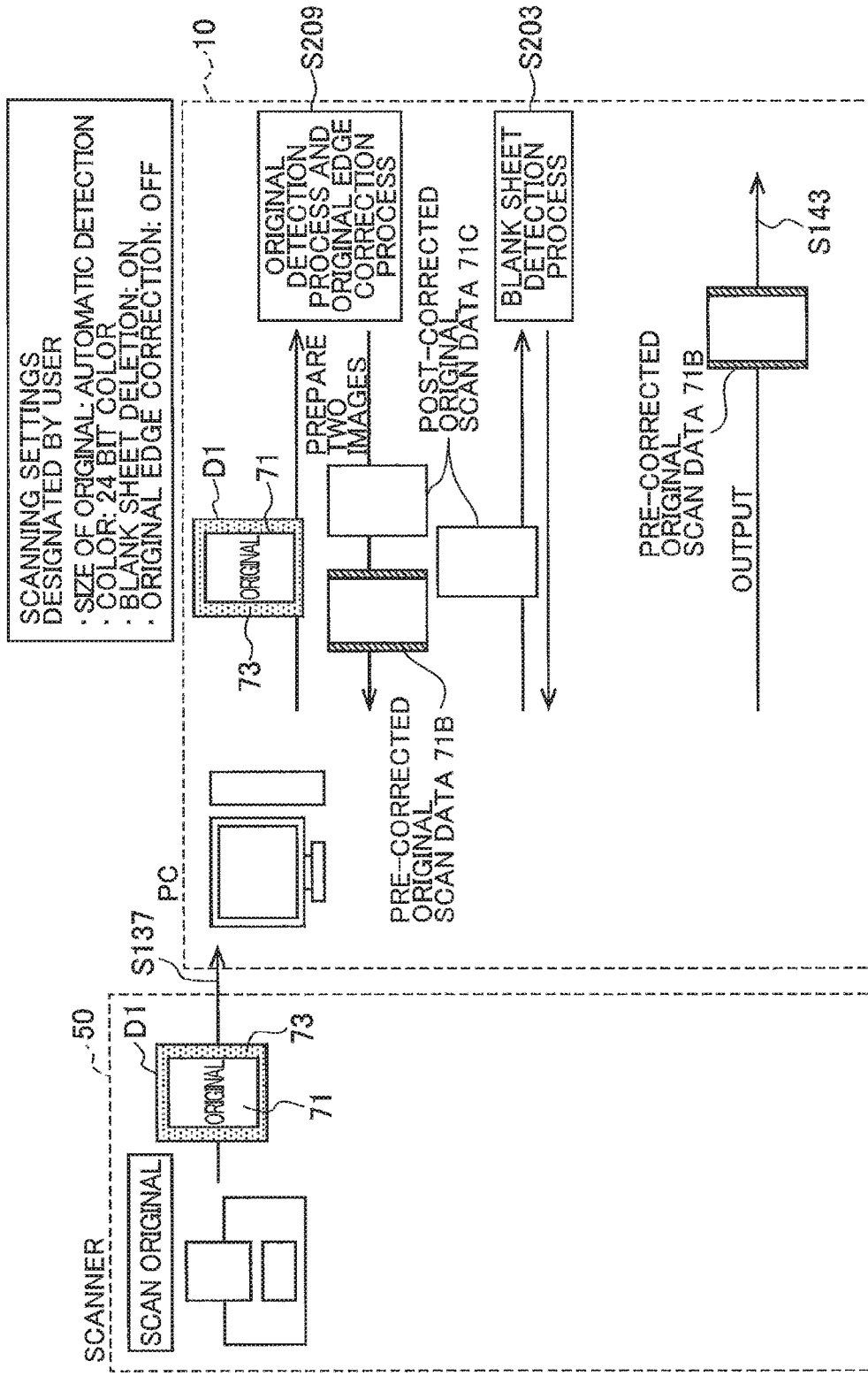
FIG. 5 is an explanation diagram illustrating processes in a case where a setting indicates execution of blank sheet detection process.

Next, an original edge correction process executed on the PC 10 will be described as an example of the image reading process in the operational sequence described above. For convenience, the following description will omit some of the same details described in FIG. 4. FIG. 5 shows the sequence of processes performed for the original edge correction process. In the example shown in FIG. 4, the system 1 do not execute the original edge process, and thus settings for the original edge process cannot be set by the user. In the example shown in FIG. 5, the scanning settings include a setting value specifying that the original size is to be automatically detected and the original image is to be automatically extracted, a setting value specifying 24-bit color as the number of colors in the scanned original, a setting value specifying that the blank sheet detection process is to be executed, and a setting value specifying that the original edge correction process is not to be executed. The following description assumes that the maximum size of an original that the scanner 50 can read is the A4 size and that the size of the original actually being read is the postcard size.

As in the case of FIG. 4 described above, the scanner 50 reads the original having a postcard-size, and generates the A4-size scan data D1 including the scan data 71 for a postcard-size original. Specifically, the scanner 50 generates the scan data D1 by adding the outer scan data 73 around the periphery of the original scan data 71. The scanner 50 transmits the scan data D1 with the outer scan data 73 added to the original scan data 71 (an example of the first scan data) to the PC 10 (an example of the first acquisition). The driver image process module 28E on the PC 10 executes the image processes on the scan data D1 (S141 of FIG. 3), as described above.

More specifically, the driver main process module 28B first stores the scan data D1 received from the scanner 50 in the data storage area 34 of the memory 14, for example. The driver main process module 28B then reads the scan data D1 from the memory 14 and outputs the scan data D1 to the driver image process module 28E.

The driver image process module 28E performs the image process(es) on the scan data DL received from the driver main process module 28B (S141 of FIG. 3). In S209 of FIG. 5 the driver image process module 28E executes the original detection process and the original edge correction process on the scan data D1 received from the driver main process module 28B.

Figure 6:
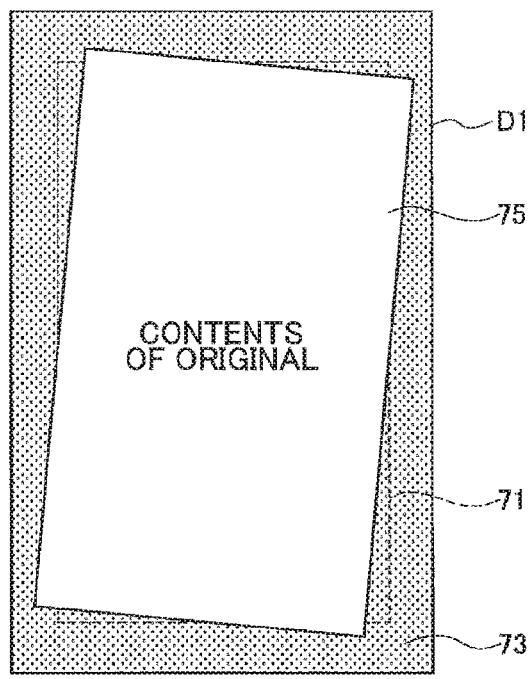
FIG. 6 is a schematic diagram illustrating scan data by reading an skewed original.

If the original is skewed during scanning or if a peripheral part of the original has been torn, a peripheral portion of the original scan data 71 extracted in S209 may include an image area having the same color as the outer scan data 73. FIG. 6 shows an example of an image read from a skewed original 75. The dashed line in FIG. 6 indicates the portion of the scan data D1 extracted as the original scan data 71 representing an image of the original 75. However, the original 75 is skewed relative to the region extracted as the original scan data 71. Consequently, the image cropped as the original scan data 71 in this scan data D1 will contain an image of the scanner's cover pressing against the back surface of the original 75, i.e., an image having the same color as the outer scan data 73.

Figure 7:
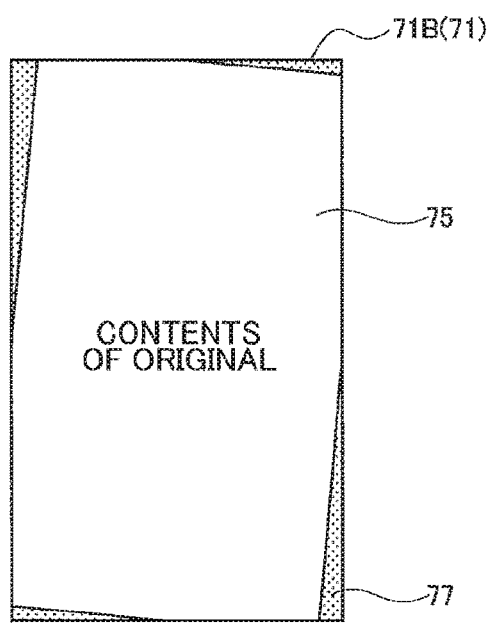
FIG. 7 is a schematic diagram illustrating pre-corrected original scan data.

FIG. 7 shows the image resulting from extracting the original scan data 71. As shown in FIG. 7, background scan data 77 having the same color as the outer scan data 73 is included in parts of the original scan data 71 (especially, peripheral parts of the original scan data 71). The background scan data 77 has the color of the inside surface on the scanner's cover, which is gray in this example. In the original edge correction process, the background scan data 77 contained in this original scan data 71 is corrected to match the color of the original 75.

Figure 8:
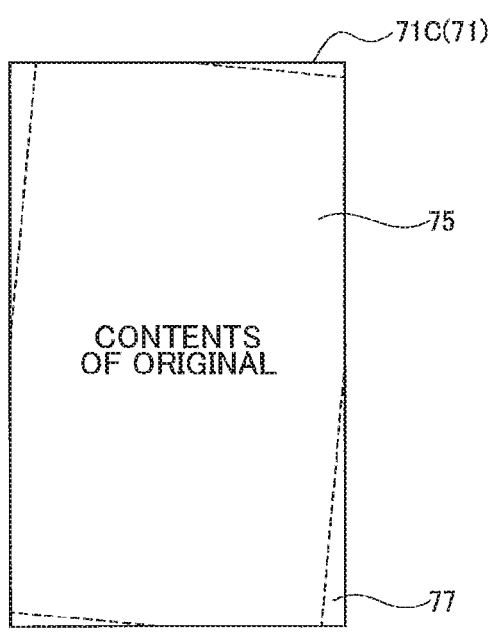
FIG. 8 is a schematic diagram illustrating post-corrected original scan data.

Specifically, the original edge correction process corrects the background scan data 77 in the original scan data 71 using a light color (a color having a lightness larger than a prescribed value, for example) that occupies the greatest percentage of the original 75, for example. FIG. 8 shows sample results of original edge correction performed on the original scan data 71 by coloring over the background scan data 77 with white as the light color. The dashed line in FIG. 8 is a virtual line indicating the region of the skewed original 75. As shown in FIG. 8, regions outside the skewed original 75 having the same color as the outer scan data 73 are eliminated by filling in the background scan data 77 with the color white.

In the following description, the original scan data 71 shown in FIG. 7 before the original edge correction process is performed will be called the pre-corrected original scan data 71B (an example of the second scan data), and the original scan data 71 shown in FIG. 8 after the original edge correction process is performed will be called the post-corrected original scan data 71C (an example of the third scan data). In S209 of FIG. 5 the driver image process module 28E generates both the pre-corrected original scan data 71B and the post-corrected original scan data 71C. Specifically, in S209 the driver image process module 28E first executes the original detection process to extract the pre-corrected original scan data 71B from the scan data D1 received from the driver main process module 28B (the original scan data 71 with the added outer scan data 73). The driver image process module 28E stores the extracted pre-corrected original scan data 71B in the memory 14. Here, the driver image process module 28E may delete the scan data D1 stored by the driver main process module 28B in the memory 14 in response to executing the original detection process. In the process of FIG. 5, the scan data D1 becomes unnecessary after the original detection process is executed. Thus, by deleting the scan data D1 from the memory 14 when the scan data D1 is no longer necessary, the driver image process module 28E can prevent the storage area of the memory 14 from filling up unnecessarily.

Subsequently, in S209 the driver image process module 28E reads the pre-corrected original scan data 71B from the memory 14 and executes the original edge correction process on the pre-corrected original scan data 71B. Here, the driver image process module 28E detects whether a fixed range along the periphery of the pre-corrected original scan data 71B (a few millimeters inward from the outer edge, for example) contains any images having the same color as the outer scan data 73, such as a gray image. The driver image process module 28E fills any gray images detected in this fixed range, i.e., the background scan data 77 (see FIG. 7), with a prescribed correction color (white, for example). The correction color is set to a color of the largest color region among color regions in the image represented by the pre-corrected original scan data 71B, excluding the fixed range on the periphery, and the correction color is a light color whose lightness is larger than a prescribed value. Here, each color region is occupied with a color. The driver image process module 28E colors over the detected gray images with the correction color to generate the post-corrected original scan data 71C. The driver image process module 28E stores this post-corrected original scan data 71C in the memory 14.

As described above, in S209 the driver image process module 28E executes the original edge correction process on the pre-corrected original scan data 71B generated in the original detection process and stored in the memory 14. In other words, the driver image process module 28E executes the original edge correction process using the results of the original detection process. This configuration eliminates the need to regenerate the pre-corrected original scan data 71B from the scan data D1 in the original edge correction process, thereby simplifying and speeding up the image processes.

After creating the pre-corrected original scan data 71B and post-corrected original scan data 71C in S209, in S203 the driver image process module 28E executes the blank sheet detection process. When the entire image represented by the post-corrected original scan data 71C is white in color, for example, the driver image process module 28E detects information indicating that the original is a blank sheet (an example of the characteristic information) by executing the blank sheet detection process using the post-corrected original scan data 71C. In this case, the driver image process module 28E discards the original scan data 71 of the blank sheet, for example.

In the example of FIG. 5, a setting specifying that the original edge correction is not executed has been set for one scanning parameter. Here, when text or the like is printed close to the outer edges in the original 75, the text or the like close to the outer edges in the original 75 may be disappeared when the original edge correction process is performed. In order to avoid such situation, the user may wish to set this setting specifying that the original edge correction process is not executed. On the other hand, when the original is a blank sheet and when the original scan data 71 contains the same color as the outer scan data 73 (gray), the driver image process module 28E may be unable to detect with accuracy in the blank sheet detection process. Therefore, the scanner driver 28 according to the embodiment generates the post-corrected original scan data 71C by executing the original edge correction process, even when the user has set the setting indicating that the original edge correction process is not to be performed. The scanner driver 28 then executes a blank sheet detection process using the post-corrected original scan data 71C, thereby improving the detection precision in the blank sheet detection process.

If the scanner driver 28 detects that the post-corrected original scan data 71C is not a blank sheet by executing the blank sheet detection process on the post-corrected original scan data 71C in S203 of FIG. 5, in S143 the driver image process module 28E outputs the pre-corrected original scan data 71B. In other words, the driver image process module 28E outputs the pre-corrected original scan data 71B as the output data without executing edge correction according to the user's wishes. Hence, the driver image process module 28E can output the pre-corrected original scan data 71B according to the user's wishes and can improve detection precision in the blank sheet detection process. Note that the driver image process module 28E may delete the post-corrected original scan data 71C stored in the memory 14 after executing the blank sheet detection process. By deleting the post-corrected original scan data 71C from the memory 14 when it is no longer needed, the storage area of the memory 14 can be prevented from filling up unnecessarily.

Figure 9:
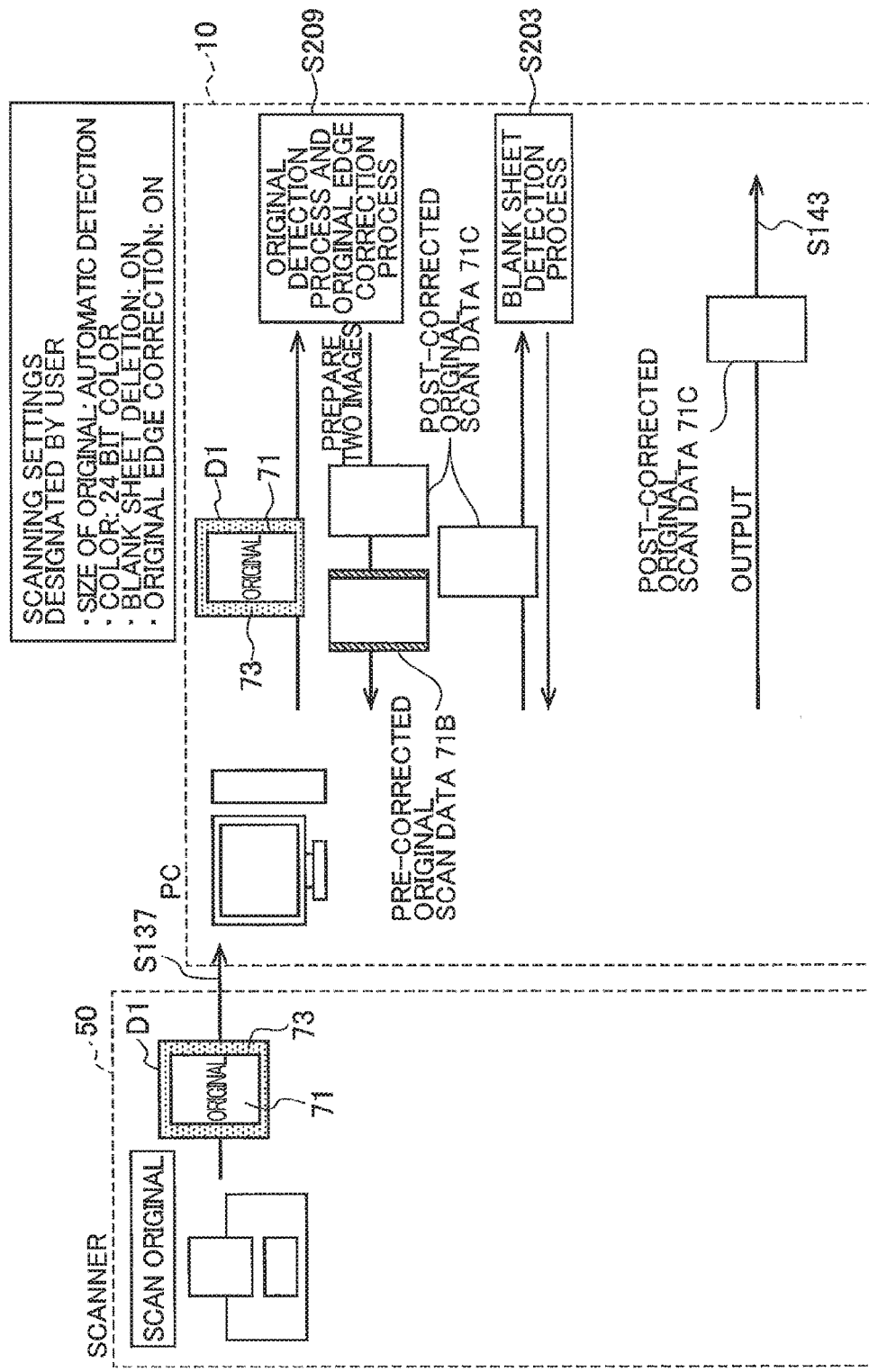
FIG. 9 is an explanation diagram illustrating processes in a case where a setting indicates execution of an original edge correction process.

The example of FIG. 5 described above covers the case in which a setting specifying that the original edge correction process is not to be executed has been set for the scanning parameter. However, if a setting specifying that the original edge correction is to be executed has been set in the scanning parameter, i.e., if the user wishes to output the post-corrected original scan data 71C that has undergone edge correction, the driver image process module 28E outputs the post-corrected original scan data 71C. FIG. 9 shows the case in which the setting specifying that the original edge correction is to be executed has been set in the scanning parameter. As shown in FIG. 9, the driver image process module 28E executes the blank sheet detection process on the post-corrected original scan data 71C (S203) and in S143 outputs the post-corrected original scan data 71C when the original is not a blank sheet. In this way, the driver image process module 28E can output the post-corrected original scan data 71C when the user desires edge correction, and the user can subsequently perform various processes on the post-corrected original scan data 71C through the application program 26.

Original Edge Correction Process and Scale Detection Process

Figure 10:
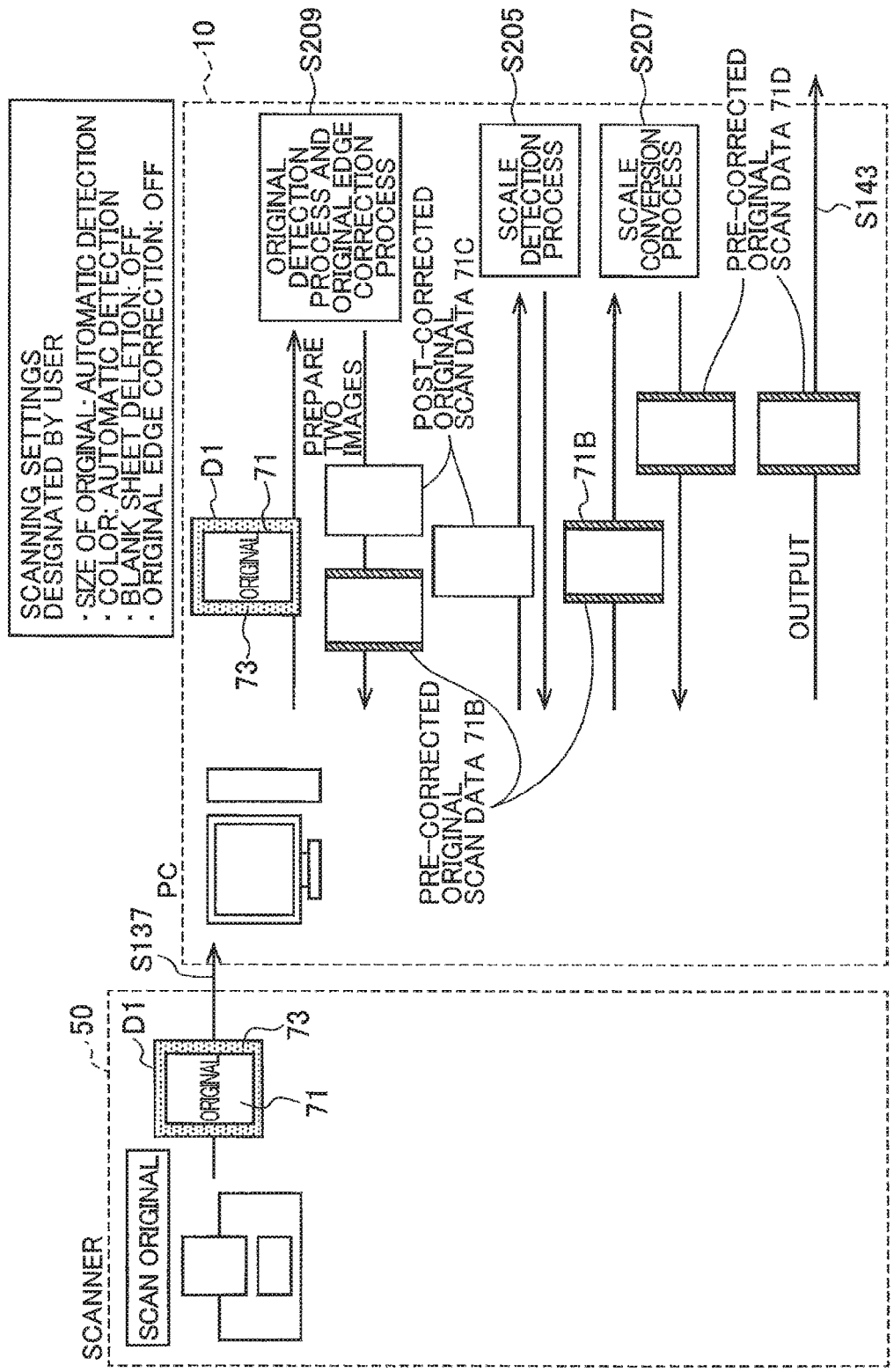
FIG. 10 is an explanation diagram illustrating processes in a case where a setting indicates execution of a scale conversion process.

Next, a description will be given for the case in which one of the scanning parameters has been set to a value indicating that the colors (or suitable color scale) in the scanned original is automatically detected. FIG. 10 shows an example of a process when automatically detecting colors (or suitable color scale) in the original. In the example of FIG. 10, the scanning settings includes a setting indicating that the original size is to be automatically detected, a setting indicating that colors (or suitable color scale) in the scanned original are to be automatically detected, a setting indicating that the blank sheet detection is not to be executed, and a setting indicating that the original edge correction is not to be executed. For convenience, the following description omits some of the details identical to the process described above for FIGS. 4, 5, and 9.

In S137 the scanner 50 first generates the scan data D1 by adding the outer scan data 73 around the outer edges of the original scan data 71 and transmits this scan data D1 to the PC 10. In S209 the driver image process module 28E on the PC 10 executes the original detection process and the original edge correction process on the scan data D1 stored in the memory 14. Specifically, the driver image process module 28E executes the original detection process to generate the pre-corrected original scan data 71B from the scan data D1 and stores the pre-corrected original scan data 71B in the memory 14. The driver image process module 28E also executes the original edge correction process to generate the post-corrected original scan data 71C from the pre-corrected original scan data 71B and stores the post-corrected original scan data 71C in the memory 14. Note that the driver image process module 28E may delete the scan data D1 from the memory 14 after executing the original detection process.

In S205 the driver image process module 28E then executes the scale detection process on the post-corrected original scan data 71C read from the memory 14 to determine the suitable color scale of the post-corrected original scan data 71C. In S207 the driver image process module 28E executes the scale conversion process to convert the color scale of the pre-corrected original scan data 71B the suitable color scale determined in S205. In other words, the driver image process module 28E uses the post-corrected original scan data 71C in the scale detection process, but uses the pre-corrected original scan data 71B in the scale conversion process. The post-corrected original scan data 71C is used in place of the pre-corrected original scan data 71B for the scale detection process because the pre-corrected original scan data 71B includes the gray background scan data 77 around the outer edges of the original. Consequently, if the driver image process module 28E were to execute the scale detection process of S205 using the pre-corrected original scan data 71B when the original is a monochrome image, the driver image process module 28E may mistakenly determine that the monochrome image is an 8-bit gray scale image.

Hence, the driver image process module 28E of the embodiment can improve the detection accuracy of the suitable color scale by using the post-corrected original scan data 71C in the scale detection process since the post-corrected original scan data 71C has undergone the original edge correction. Subsequently, in S207 the driver image process module 28E executes the scale conversion process on the pre-corrected original scan data 71B, which has not undergone original edge correction as desired by the user, and in S143 outputs the converted pre-corrected original scan data 71D as the output data. Through this process, the driver image process module 28E can output the pre-corrected original scan data 71D according to the user's request and can execute the scale conversion process with precision. Note that the driver image process module 28E may delete the post-corrected original scan data 71C from the memory 14 after executing the scale detection process in S205 since the post-corrected original scan data 71C is no longer needed in subsequent processes. This action can prevent the storage area of the memory 14 from filling up unnecessarily.

The example shown in FIG. 10 is described for a case in which one of the scanning parameters is set to the setting indicating that the original edge correction is not to be executed. However, if a setting indicating that the original edge correction is to be executed has been set for the scanning parameter, the driver image process module 28E performs processes on the post-corrected original scan data 71C as described in the example of FIG. 9. Specifically, the driver image process module 28E executes the scale conversion process of S207 on the post-corrected original scan data 71C. Next, the driver image process module 28E outputs the post-corrected original scan data 71C with the converted color scale. Accordingly, when the user desires original edge correction to be performed, the driver image process module 28E outputs an image that has undergone the original edge correction so that the user can perform various processes on this image data with the application program 26.

The memory 14 is an example of a storage. The LCD 16 and the input interface 18 are examples of a user interface. The PC 10 is an example of an information processing apparatus. The scanning settings are examples of setting values. The driver main process module 28B is an example of a processor performing receiving a first scan data. The driver user interface module 28D is an example of a processor performing receiving a setting value. The driver image process module 28E is an example of a processor performing determining, clopping, an edge correction process, acquiring characteristic information, and a specific process. The scan data D1 is an example of first scan data. The pre-corrected scan data 71B is an example of second scan date. The post-corrected scan data 71C is an example of third scan data.

Effects of the Embodiment

The embodiment described above has the following effects.

The driver image process module 28E executes the scale detection process or the blank sheet detection process. The scale detection process is performed to acquire the number of colors (or the suitable color scale) in the post-corrected scan data 71C as the characteristic information. The blank sheet detection process is performed to acquire information, as the characteristic information, specifying whether the post-corrected scan data 71C is based on a blank original. With this configuration, the driver image process module 28E can execute the scale detection process and the blank sheet detection process with accuracy.

The driver image process module 28E executes an edge correction process by detecting image areas in the peripheral portion of the pre-corrected scan data 71B having the same color as the outer scan data 73 and by correcting the detected image areas to the color of the original based on the original scan data. This process can eliminate unnecessary data in the pre-corrected scan data 71B caused by skew in the original or the like.

The driver image process module 28E executes the scale conversion process or/and the process for eliminating the blank sheet worth of image data on the post-corrected scan data 71C generated by the edge correction process when it is determined that scan data, which has undergone the original detection process, the blank sheet detection process or/and the scale detection process, the original edge correction process is to be outputted. The scale conversion process or/and the process for eliminating the blank sheet worth of image data is a process performed on the post-corrected scan data 71C based on the characteristic information acquired by the scale detection process or the blank sheet detection process. With this configuration, the driver image process module 28E can output scan data that has undergone user-desired edge correction.

The PC 10 includes the memory 14. The driver main process module 28B acquires the scan data D1 and stores the scan data D1 in the memory 14. The driver image process module 28E reads the scan data D1 from the memory 14, generates the scan data 71 from the scan data 71 (71B), and stores the scan data 71 (71B) in the memory 14. The driver image process module 28E executes the original edge correction process on the scan data 71 (71B) read from the memory 14 to generate the scan data 71C and stores the scan data 71C in the memory 14. The driver image process module 28E acquires the characteristic information (suitable color scale or information about whether the scan data 71 is based on the blank sheet) based on the scan data 71C read from the memory 14. With this configuration, the driver image process module 28E can execute edge correction faster and more efficiently using the scan data 71B generated by the clipping the scan data D1 to generate the scan data 71B.

The driver image process module 28E deletes the scan data D1 from the memory 14 after generating the scan data 71B by clipping the scan data D1. By deleting the scan data D1 from the memory 14 when the data is no longer needed, the driver image process module 28E can prevent the storage area of the memory 14 from filling up unnecessarily.

The driver image process module 28E deletes the scan data 71C from the memory 14 after acquiring the characteristic information. By deleting the scan data 71C from the memory 14 when the data is no longer needed, the driver image process module 28E can prevent the storage area of the memory 14 from filling up unnecessarily.

The blank sheet detection process is performed to acquire information indicating whether the scan data 71C is based on a blank original as the characteristic information. The driver image process module 28E performs the process to discard the scan data 71C based on a blank original when the characteristic information indicates that the scan data 71C is based on a blank original. By deleting scan data for a blank original in this way, the driver image process module 28E can prevent the outputting of unnecessary data and the like.

The driver image process module 28E performs the scale conversion process as the image process on the scan data 71 to generate the scan data 71A or 71D that has been subjected to the image process based on the characteristic information acquired by the scale detection process. The scale conversion process instructs the PC 10 to perform outputting the scan data 71A or 71D generated in the scale conversion process. This configuration makes it possible to output scan data that has undergone the user-desired image process(es).

While the disclosure has been described in detail with reference to specific embodiment thereof, it would be apparent to those skilled in the art that many modifications and variations may be made therein without departing from the scope of the invention, which is defined by the attached claims.

For example, while the scanner driver 28 of the PC 10 executes the original detection process, the blank sheet detection process, the scale detection process, the scale conversion process, the original edge correction process in the embodiment described above, the program 61 of the scanner 50 may execute some or all of these processes. In such cases, the scanner 50 is an example of the information processing apparatus, and the program 61 is an example of the control program.

While the embodiment describes a case in which the CPU 12 executes processes on the PC 10, the PC 10 may execute the processes such as the original edge correction process shown in FIG. 5 and the like using an ASIC or other logic integrated circuit rather than the CPU 12, or may execute these processes through a combination of CPUs, ASICs, and other logic integrated circuits.

Further, while the driver image process module 28E generates and stores the scan data D1, the pre-corrected original scan data 71B, and the post-corrected original scan data 71C in the memory 14, the driver image process module 28E need not store this data in the memory 14.

What is claimed is:

1. A non-transitory computer readable storage medium storing a set of program instructions for an information processing apparatus including an interface and a processor, the set of program instructions, when executed by the processor, causing the information processing apparatus to:
   receive a setting value via the interface;
   acquire first scan data;
   determine, on the basis of the setting value, at least one image process to be performed on the first scan data from among a plurality of image processes, wherein after all of the at least one image process is performed on the first scan data to generate resultant data, the resultant data is to be outputted, wherein the plurality of image processes includes a clipping process, an edge correction process, and a characteristic acquisition process;
   perform the clipping process on the first scan data to generate second scan data including original scan data and not including outer scan data, the original scan data being determined as a part of the first scan data representing an original image, the outer scan data being determined as another part of the first scan data representing an outer image around the original image, the original scan data including edge data representing an edge of the original image;
   perform the edge correction process on the second scan data to generate third scan data by correcting the edge data;
   perform the characteristic acquisition process on the third scan data to acquire characteristic information indicating a characteristic of the third scan data; and
   perform a specific process on the second scan data by using the characteristic information which is acquired by using the third scan data in a case where the determining determines both the clipping process and the characteristic acquisition process are to be performed and the edge correction process is not to be performed.

2. The non-transitory computer readable storage medium according to claim 1, wherein the characteristic acquisition process includes at least one of a scale detection process and a blank sheet detection process, the scale detection process being for acquiring information for a target color scale based on number of colors used in the third scan data, the blank sheet detection process being for detecting whether the third scan data represents a blank sheet.

3. The non-transitory computer readable storage medium according to claim 1, wherein the edge correction process detects from the edge data an image having a same color as a color of the outer image represented by the outer scan data, and corrects the second scan data so that the color in the detected image is converted to another color based on the second scan data.

4. The non-transitory computer readable storage medium according to claim 1, wherein the set of program instructions, when executed by the processor, further causes the information processing apparatus to perform another specific process on the third scan data by using the characteristic information in a case where the determining determines all of the clipping process, the characteristic acquisition process, and the edge correction process are performed.

5. The non-transitory computer readable storage medium according to claim 1, wherein the information processing apparatus further includes a storage,
   wherein the set of program instructions, when executed by the processor, further causes the information processing apparatus to store the acquired first scan data in the storage,
   wherein the clipping process performs:
      reading the first scan data from the storage;
      generating the second scan data based on the read first scan data; and
      storing the generated second scan data in the storage,
   wherein the edge correction process is performed on the second scan data read from the storage to generate the third scan data, the generated third scan data being stored in the storage, and
   wherein the characteristic acquisition process is performed on the third scan data read from the storage.

6. The non-transitory computer readable storage medium according to claim 5, wherein the set of program instructions, when executed by the processor, further causes the information processing apparatus to delete the stored first scan data after the clipping process is completed.

7. The non-transitory computer readable storage medium according to claim 5, wherein the set of program instructions, when executed by the processor, further causes the information processing apparatus to delete the stored third scan data after the characteristic acquisition process is complete.

8. The non-transitory computer readable storage medium according to claim 1, wherein the characteristic acquisition process includes a blank sheet detection process to acquire, as the characteristic information, information about whether the third scan data represents a blank sheet, and
   wherein the specific process includes a deletion process to delete the third scan data in a case where the blank sheet detection process acquires the information indicating that the third scan data represents the blank sheet.

9. The non-transitory computer readable storage medium according to claim 1, wherein the specific process generates fourth scan data by performing an image process using the characteristic information, and
   wherein the set of program instructions, when executed by the processor, further causes the information processing apparatus to output the fourth scan data.

10. The non-transitory computer readable storage medium according to claim 1, wherein the characteristic information indicates a target color scale based on a number of colors used in the third scan data, and wherein the specific process includes a color conversion process to convert a color scale of the second scan data to the target color scale.

11. An information processing apparatus comprises:
an interface; and
a processor configured to:
   receive a setting value via the interface;
   acquire first scan data;
   determine, on the basis of the setting value, at least one image process to be performed on the first scan data from among a plurality of image processes, wherein after all of the at least one image process is performed on the first scan data to generate resultant data, the resultant data is to be outputted, wherein the plurality of image processes includes a clipping process, an edge correction process, and a characteristic acquisition process;
   perform the clipping process on the first scan data to generate second scan data including original scan data and not including outer scan data, the original scan data being determined as a part of the first scan data representing an original image, the outer scan data being determined as another part of the first scan data representing an outer image around the original image, the original scan data including edge data representing an edge of the original image;
   perform the edge correction process on the second scan data to generate third scan data by correcting the edge data;
   perform the characteristic acquisition process on the third scan data to acquire characteristic information indicating a characteristic of the third scan data; and
   perform a specific process on the second scan data by using the characteristic information which is acquired by using the third scan data in a case where the determining determines both the clipping process and the characteristic acquisition process are to be performed and the edge correction process is not to be performed.

* * * * *